April 14, 1931.  J. E. GRAVES  1,800,291
CHUCK
Filed June 15, 1927
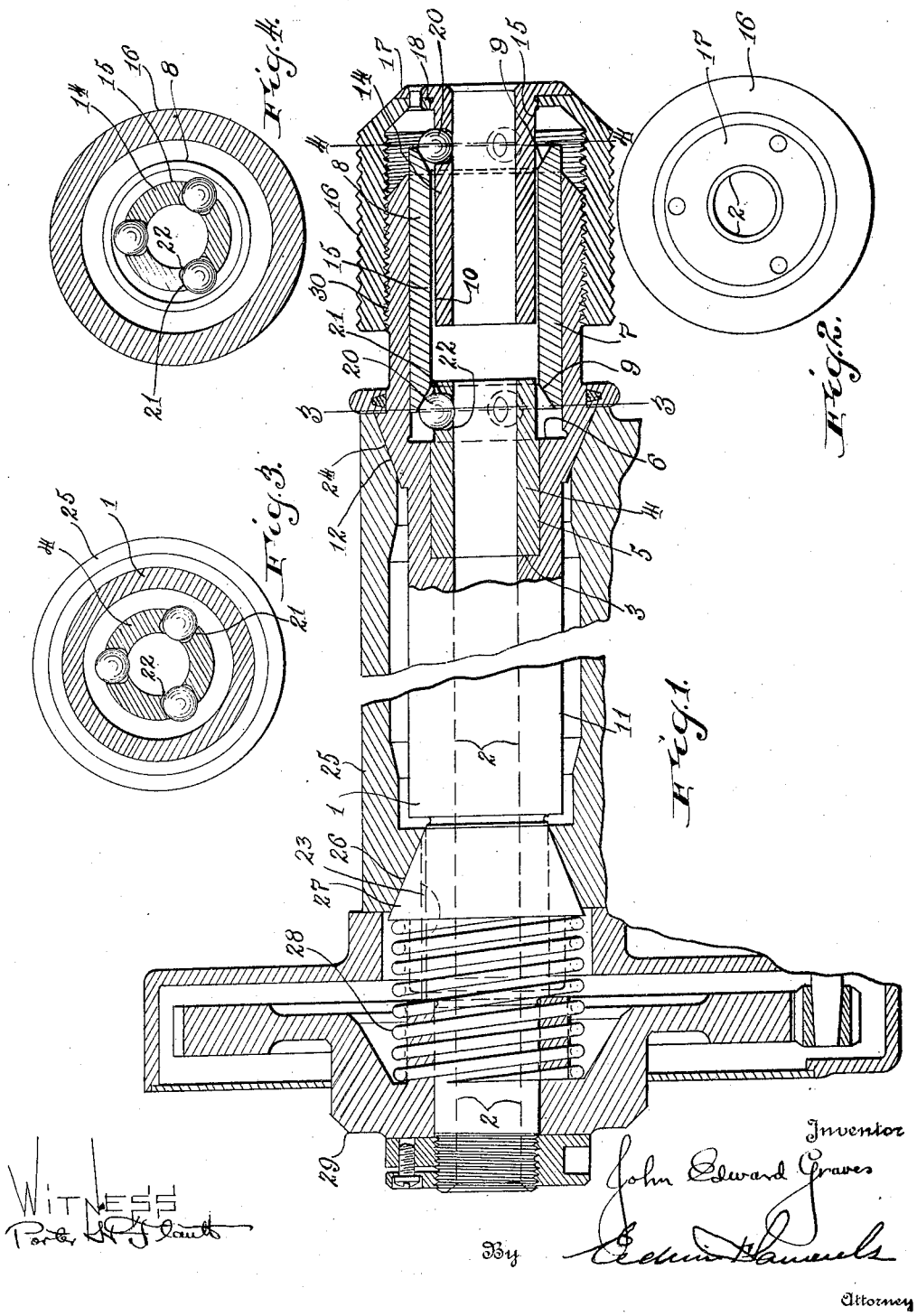
Inventor
John Edward Graves
By
Attorney Patented Apr. 14, 1931

1,800,291

UNITED STATES PATENT OFFICE

JOHN EDWARD GRAVES, OF BALTIMORE COUNTY, MARYLAND, ASSIGNOR TO THE BLACK AND DECKER MANUFACTURING COMPANY, OF TOWSON HEIGHTS, MARYLAND, A CORPORATION OF MARYLAND

CHUCK

Application filed June 15, 1927. Serial No. 198,884.

In the resurfacing of internal combustion motor and similar valves by means of resurfacing machines of the type in which the valve stem is placed in a chuck and rotated in contact with a rotating grinding wheel across the surface of which it is fed as the grinding operation progresses, a slight variation in the alignment of the valve and stem produces a corresponding variation of the angle of the valve seating surface causing it to correspondingly diverge from the angle of the seating surface, it being impossible to produce uniform contact when the valve surface is out of line or off center. The principal difficulty which has been encountered in the effort to produce a machine by which a perfect result in the way of resurfacing such valves can be obtained in every instance by the average workman, is that incident to the production of a chuck whereby the valve is held in every instance with its axis in exact alignment with the spindle of the grinding machine.

The object of the present invention is to produce a chuck by which the valve stem may be clamped to the grinding spindle, the valve stem being positioned in every instance with its axis in exact alignment with the axis of the spindle, the alignment being automatic, and hence an incident to the closing of the chuck.

In the preferred form of the invention illustrated, the gripping action of the chuck is obtained by means of a series or two sets of balls spaced apart in the direction of the axis of the spindle. These are arranged about the inner circumference of the hollow spindle or chuck body and held in position by suitable carriers, the balls being forced inward simultaneously with uniform pressure as the chuck cap or nut is tightened. This action with the spacing of the balls circumferentially and in the direction of the axis serves to center and position the valve stem with extreme accuracy, the inward tendency imparted to the balls being in a practical sense absolutely uniform.

To avoid the inaccuracy resulting from the seating of the chuck body on a tapered spindle in accordance with the usual practice, the chuck is, in accordance with the preferred form of the invention, made integral with the spindle.

In the accompanying drawings I have illustrated a grinder spindle with the driving gear therefor, the spindle being equipped with a chuck embodying the features of the invention in the preferred form.

In the drawings:

Figure 1 is a central longitudinal section through the spindle and chuck.

Figure 2 is an end view of the chuck looking from the right in Figure 1.

Figure 3 is a section on the line 3—3 in Figure 1.

Figure 4 is a section on the line 4—4 in Figure 1.

Referring to the drawings by numerals, each of which is used to indicate the same or similar parts in the different figures, the spindle indicated by reference character 1 is preferably hollow, the opening or bore being indicated by reference character 2. This opening or bore is enlarged at the chuck end, forming an internal annular shoulder 3 against which is seated a stationary ball carrier 4 which enters what may be termed the first enlargement of the bore at 5, which reference character also indicates said internal surface. The bore or opening within the spindle is further enlarged at the chuck end forming a second annular internal shoulder 6, the enlarged opening and internal surface being indicated by reference character 7.

In this opening is a sliding sleeve 8 formed with a frusto conical or inclined internal surface 9 at each end, the ground surfaces at the opposite ends being oppositely disposed or inclined. The sleeve 8 is also ground externally, the frusto conical surfaces 9 being exactly concentric with the external ground surface. The enlarged bore opening 7 in the spindle is likewise ground concentrically with the axis of rotation and the ground sleeve 8 fits and slides in the accurately placed ground opening 7 in the spindle, so that the frusto conical surfaces 9 are concentric and coaxial with the spindle and with the axis of rotation. The opening 10 in the sleeve is of slightly greater diameter than the outside diameter of the stationary carrier 4 so that the sleeve at its inner end may admit the outer end of the stationary carrier 4.

In this connection it is of interest to note that the spindle being first ground with extreme accuracy as to the external surface 11, it is then ground coaxially with said surface as to the internal surface 7 and later as to the tapered external bearing surface 12, to be later discussed, the accurate positioning of the valve stems being dependent upon the accuracy with which the ground surfaces 9 are located.

At the forward end of the spindle is the sliding ball carrier 14 which enters freely within the opening 10 of the sleeve 8. This carrier 14 is secured at its outer end to the chuck nut or cap 16 which encloses the end of the spindle or chuck body engaging thread 30 thereon. In the form shown, the carrier 14 is provided with an outwardly disposed flange 17 at its outer end, which flange overlies and is riveted to an inwardly disposed underlying flange 18 on the nut or cap 16. The nut is knurled on its outside and is hand operated. The gripping balls 20, of which each carrier preferably contains 3, are seated in radial openings or holes 21 in the carriers equally spaced about the circumference, which holes or openings 21 prevent displacement and loss of the balls by passage of the same into the central opening 2, are bored from the outside, the bore or seat 21 in each instance not being completed for its full diameter into the inside opening 2. In this way an annular shoulder or flange 22 is provided at the inner end of each opening, which shoulder or flange prevents the entrance of the balls into the central opening or bore 2 in the spindle, but permits it to project into said opening. The ball seats are preferably equally spaced in the direction of the circumference.

The spindle 1 in the construction shown, is provided with a tapered external bearing 12 at one end which engages an internal tapered bearing surface 24 on the bearing sleeve 25 which supports the spindle and is provided with an oppositely tapered internal bearing surface 26 at its opposite end, the same being engaged by a sliding cone 27 or frusto conical member on the spindle, any play or wear being taken up by means of a spring 28 bearing at one end against the gear 29 secured to the spindle and at its other end against the sliding cone 27. It will be noted that the end of the spindle serves as a chuck body so that the external bearing surface 12 is in effect formed on the chuck body, the chuck body being in fact aligned by this surface in connection with the conical member 27 which engages the cylindrical surface 23 on the spindle integral with the chuck body.

In the operation of the chuck in connection with the grinder or other apparatus the valve stem or tool shank is inserted in the bore through the carriers 14 and 4, also extending in most instances into the spindle proper. The desired gripping action is then obtained by rotating the nut or cap 16 in engagement with the thread 30 on the spindle. In this way the cap is moved backwardly along the spindle and the carrier 14 being integral therewith is likewise moved, pressing the series of balls 20 at the outer end against the internal frusto conical ground surface 9 of the sleeve 8. The sleeve being slidably mounted is thrust backwardly exercising an equal pressure by means of the two conical surfaces 9 at the opposite ends, i. e., equalizing the pressure on the two sets of balls 20 at the opposite ends of the sleeve, whereby the balls of both sets are pressed inwardly with an equal intensity. In this way the pressure on the shank at the six or more points of contact of the balls 20 being simultaneously applied and equalized, the various ground surfaces being exactly concentric, the valve stem or tool shank is held in exact coaxial alignment with the spindle.

The construction shown and described as compared to the previously known constructions gives practically exact uniformity of operation and greatly increased accuracy. It is also extremely compact and capable of production in large quantities at comparatively small cost.

I have thus described specifically and in detail a single embodiment of my invention in order that the nature and operation of the same may be clearly understood. However, the specific terms herein are used descriptively rather than in a limiting sense, the scope of the invention being defined in the claims.

What I claim as new and desire to secure by Letters Patent is:

1. The combination with a hollow spindle, the spindle having a central bore or opening, of a ball actuating sleeve fitting in the central bore and having oppositely inclined internal surfaces at its opposite ends, a closing cap engaging the outer end of the spindle, ball carriers extending inside the sleeve and located at the opposite ends of the sleeve and gripping balls in said carriers adapted to be engaged simultaneously by said inclined surfaces and forced inwardly with an equalized pressure by said cap.

2. A chuck comprising an externally threaded member having an internal bore, a sleeve having oppositely tapered internal surfaces at its opposite ends mounted to slide in said bore, a threaded cap engaging the thread, a ball carrier adapted to slidably engage the inside of the sleeve and connected to the cap, a ball carrier slidably engaging the inside of the sleeve at the opposite end of the sleeve, means for positioning the latter carrier and balls in said carriers adapted to be engaged by the tapered surfaces and forced inwardly thereby as the cap is screwed up on the thread.

3. A chuck comprising an externally threaded member having a central bore, a sleeve having oppositely tapered internal surfaces at its opposite ends mounted to slide in said bore, a threaded cap engaging the thread, a ball carrier adapted to enter inside the sleeve and secured to the cap, a ball carrier in the opposite end of the sleeve and balls in said carriers, and means for positioning the second carrier and supporting the same from the side opposite the cap, whereby the balls in the respective carriers are forced by rotating the cap in closing direction against the taper of the respective ends of the sleeve, which sleeve is balanced between said sets of balls equalizing the pressure thereon by the yielding of the sleeve in either longitudinal direction.

4. The combination in a chuck of a rotary chuck body having external ground bearing and aligning surfaces, an internal cylindrical ground surface concentric with the external bearing surfaces, a sleeve having an external ground surface sliding in contact with said internal surface and having frusto conical internal ground surfaces at each end concentric with its external surface and with the spindle axis, a ball carrier having a central opening and projecting into the sleeve at the inner end of the latter, balls in said carrier extending through the same equally spaced circumferentially, a chuck nut engaging the body which is externally threaded to receive the same, a ball carrier disposed in the outer end of the sleeve and secured to the nut and having seats therein equally spaced about the circumference, balls therein projecting through the carrier, the frusto conical surfaces of the sleeve engaging both sets of balls whereby the tightening of the nut applies pressure to the balls, equalizing the pressure of the same against any member inserted in the chuck and aligning the same with the spindle.

5. The combination in a chuck having a spindle on which the chuck is mounted, of a sleeve adapted to slide freely in the direction of the chuck axis and having oppositely tapered internal surfaces spaced apart in the direction of said axes, two sets of balls, and means supporting one set in contact with each said tapered surface and means for forcing one set toward the other, and both sets against their respective tapered surfaces to close the chuck, the sliding sleeve serving to equalize the closing pressure applied to the balls of the respective sets.

Signed by me at Towson, Maryland, this 14th day of June, 1927.

JOHN EDWARD GRAVES.